United States Patent
Thubert et al.

(10) Patent No.: US 10,033,436 B2
(45) Date of Patent: Jul. 24, 2018

(54) POWER OVER WIRELESS ENERGY RECHARGE (POWER)

(71) Applicant: Cisco Technology, Inc., San Jose, CA (US)

(72) Inventors: Pascal Thubert, La Colle sur Loup (FR); Patrick Wetterwald, Mouans Sartoux (FR); Eric Levy-Abegnoli, Valbonne (FR); Stephane Labetoulle, Saint-Jeannet (FR)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 15/245,800

(22) Filed: Aug. 24, 2016

(65) Prior Publication Data

US 2018/0063797 A1    Mar. 1, 2018

(51) Int. Cl.
*H04B 5/00* (2006.01)
*H04L 12/26* (2006.01)
*H04W 52/24* (2009.01)

(52) U.S. Cl.
CPC ........... *H04B 5/0037* (2013.01); *H04L 43/16* (2013.01); *H04W 52/245* (2013.01)

(58) Field of Classification Search
CPC .. H04W 52/267; H04W 52/245; H04H 20/42; H04L 43/16; H04B 5/0037
See application file for complete search history.

(56) References Cited

U.S. PATENT DOCUMENTS 9,245,158 B2    1/2016  Gudan et al.
9,747,538 B2 *  8/2017  Gudan ............... G06K 19/0715
9,825,674 B1 * 11/2017  Leabman ............. H04B 5/0037
9,843,213 B2 * 12/2017  Leabman ................ H02J 7/025
2016/0049823 A1 *  2/2016  Stein ...................... H02J 7/025
                                                         320/108
2017/0048370 A1 *  2/2017  Kim .................... H04M 1/7253
2017/0358950 A1 * 12/2017  Zeine ..................... H02J 50/10

(Continued)

FOREIGN PATENT DOCUMENTS

WO    WO-2015123341 A1    8/2015
WO    WO-2016037100 A1    3/2016
WO    WO-2016111687 A1    7/2016

OTHER PUBLICATIONS

Ostaffe, Harry., "RF-based Wireless Charging and Energy Harvesting Enables New Applications and Improves Product Design", http://www.mouser.com/applications/rf_energy_harvesting/, 2 pages, Accessed Aug. 24, 2016, Mouser Electronics, Inc.

(Continued)

*Primary Examiner* — Hashim Bhatti
(74) *Attorney, Agent, or Firm* — Parker Ibrahim & Berg LLP; James M. Behmke; Stephen D. LeBarron

(57) ABSTRACT

In one embodiment, a device in a wireless network receives a request from a node in the network requesting electrical power. The device determines one or more power transmission parameters for the node. The device determines a power transmission schedule for the node. The device sends wireless network communications to the node in response to the request and based on the determined one or more power transmission parameters and transmission schedule for the node. The node converts the wireless network communications into stored electrical power.

18 Claims, 6 Drawing Sheets

(56) References Cited

U.S. PATENT DOCUMENTS

2018/0020320 A1* 1/2018 Choi .................. H04W 76/14
2018/0048987 A1* 2/2018 Morris ................ H04W 4/008

OTHER PUBLICATIONS

Talla et al., "Powering the Next Billion Devices with Wi-Fi", https://homes.cs.washington.edu/~gshyam/Papers/powifi.pdf, University of Washington, 13 pages, 2015, ACM.

Madhja et al., "Efficient, Distributed Coordination of Multiple Mobile Chargers in Sensor Networks", In Proceedings of the 16th ACM international conference on Modeling, analysis & simulation of wireless and mobile systems (MSWiM '13), 2013, pp. 101-108, New York, NY, USA, ACM.

Zhai et al., "A practical wireless charging system based on ultra-wideband retro-reflective beamforming", 2010 IEEE Antennas and Propagation Society International Symposium, Toronto, ON, 2010, pp. 1-4, IEEE.

\* cited by examiner

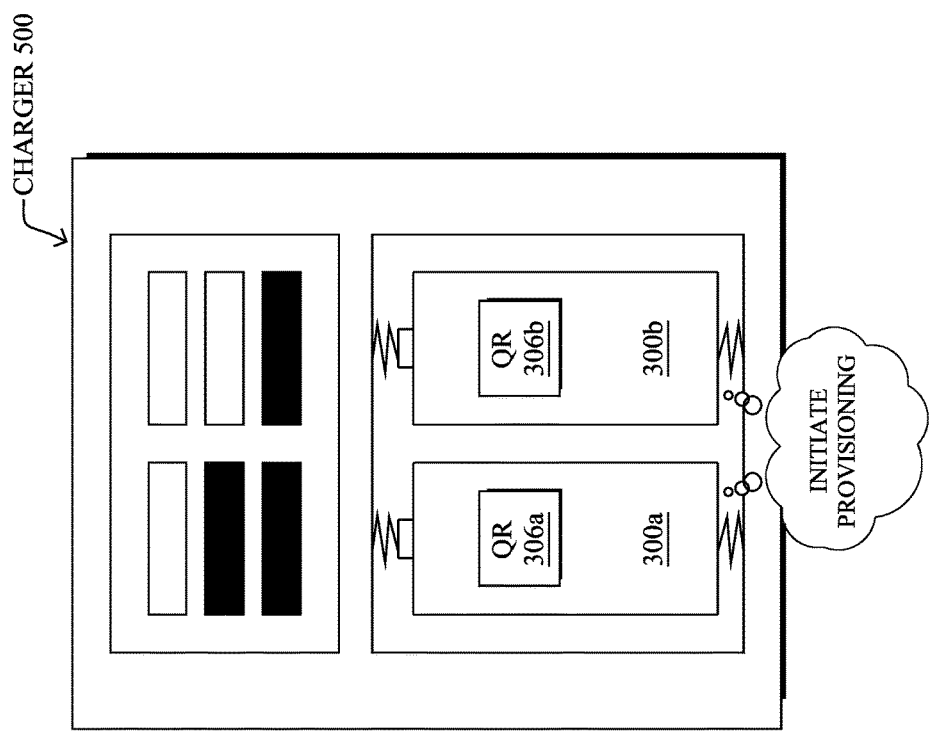

POWER OVER WIRELESS ENERGY RECHARGE (POWER)

TECHNICAL FIELD

The present disclosure relates generally to computer networks, and, more particularly, to systems and methods for charging a network device using wireless energy.

BACKGROUND

Mesh networks have become increasingly popular and practical in recent years. In particular, shared-media mesh networks, such as wireless or Powerline Communication (PLC) networks, etc., are often on what is referred to as Low-Power and Lossy Networks (LLNs), which are a class of network in which both the routers and their interconnect are constrained. Notably, LLN routers typically operate with highly constrained resources (e.g., processing power, memory, power source, etc.), and communicate via links that are characterized by high loss rates, low data rates, and/or instability.

An example implementation of LLNs is an "Internet of Things" network. Loosely, the term "Internet of Things" or "IoT" may be used to refer to uniquely identifiable objects (things) and their virtual representations in a network-based architecture. In particular, the next frontier in the evolution of the Internet is the ability to connect more than just computers and communication devices, but rather the ability to connect "objects" in general, such as lights, appliances, vehicles, heating, ventilating, and air-conditioning (HVAC) devices, windows and window shades and blinds, doors, locks, etc. The "Internet of Things" thus generally refers to the interconnection of objects (e.g., smart objects), such as sensors and actuators, over a computer network, which may be the public Internet and/or a private network.

Many battery-powered LLN and IoT devices may only transmit a few packets per day. Accordingly, the durability of such batteries may be of greater importance than the initial stored charge of the batteries.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates the network provisioning of an SBS;

DESCRIPTION OF EXAMPLE EMBODIMENTS

Overview

Figure 1:
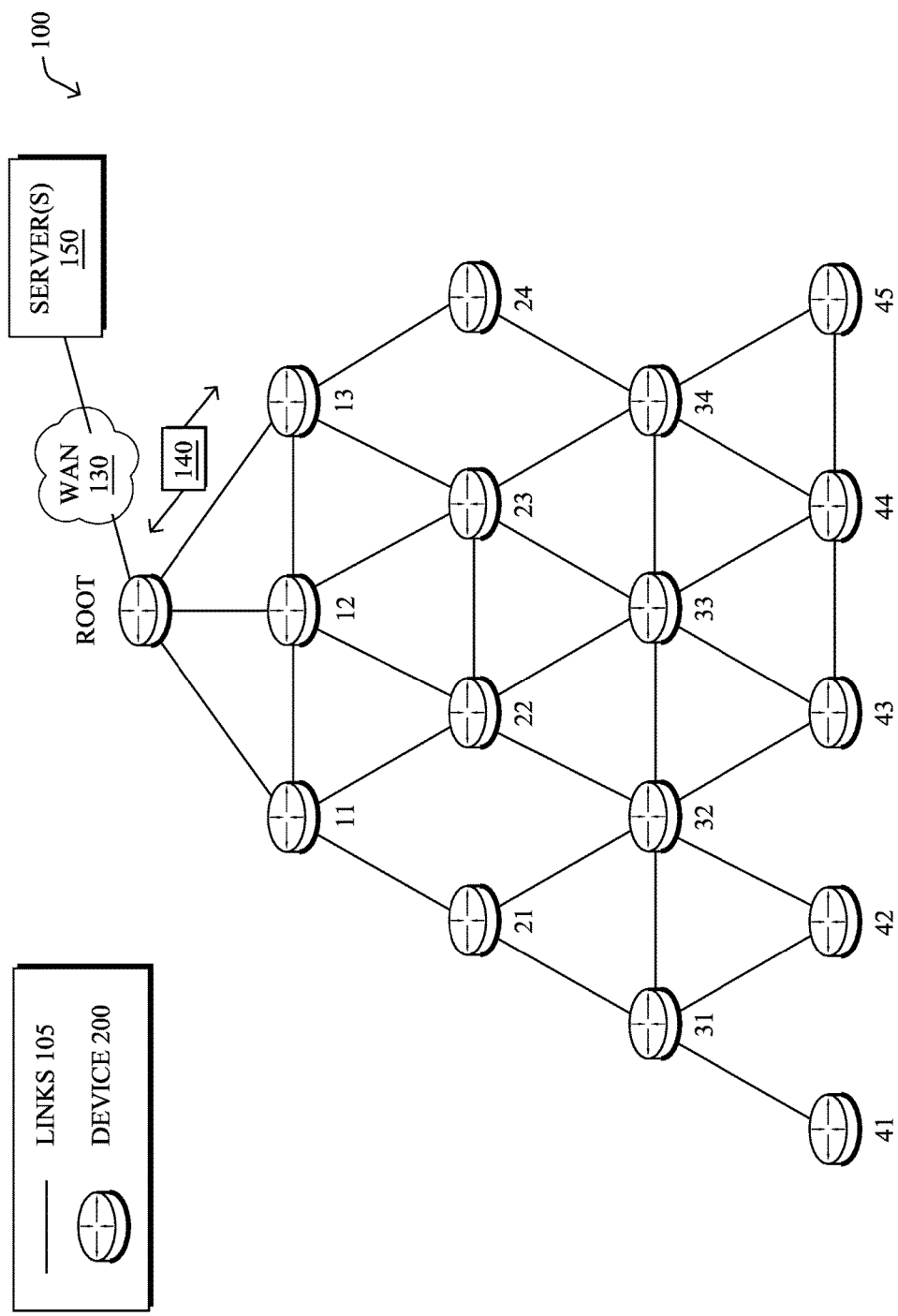
FIG. 1 illustrates an example communication network.

According to one or more embodiments of the disclosure, a device in a wireless network receives a request from a node in the network requesting electrical power. The device determines one or more power transmission parameters for the node. The device determines a power transmission schedule for the node. The device sends wireless network communications to the node in response to the request and based on the determined one or more power transmission parameters and transmission schedule for the node. The node converts the wireless network communications into stored electrical power.

In further embodiments, a node in a wireless network determines that electrical power stored by the node has decreased below a threshold. The node sends a wireless request for power to a device in the network, in response to determining that the electrical power stored by the node has decreased below the threshold. The node receives wireless communications from the device, in response to the request for power. The node converts the wireless communications into stored electrical power.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, Wi-Fi, Bluetooth®, etc.), PLC protocols, or other shared-media protocols where appropriate. In this context, a protocol consists of a set of rules defining how the nodes interact with each other.

Figure 2:
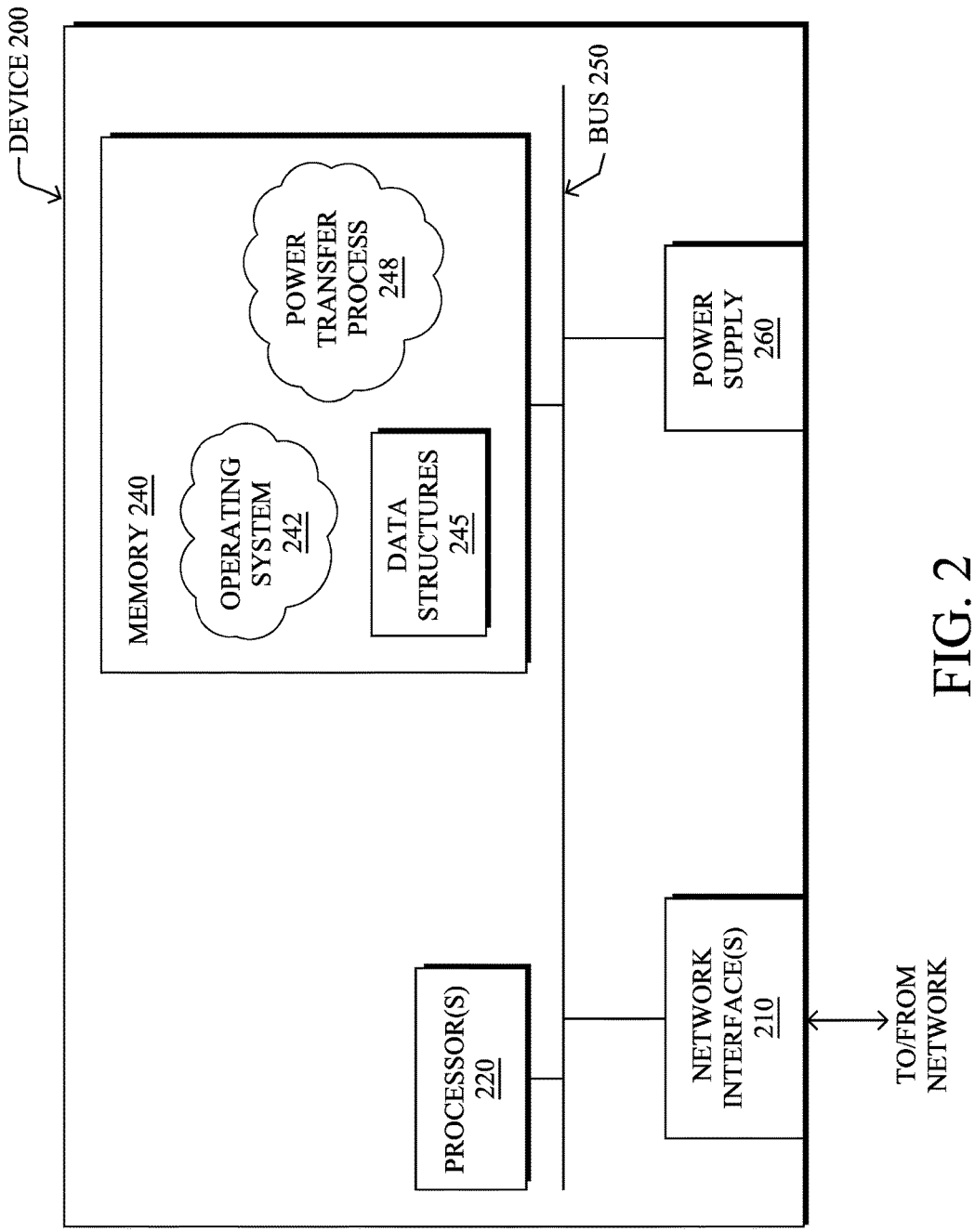
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative power transfer process 248, as described herein. Note that while process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

As noted above, many LLN and IoT devices may infrequently transmit only a few wireless packets. For example, one IoT sensor may take a sensor reading and transmit the sensor data on a daily basis. Thus, for many LLN and IoT devices, battery life may be a key design consideration.

In various embodiments, power scavenging presents a promising way to power LLN and IoT devices. For example, a device may scavenge energy from pressure, movement, heat, sunlight, radio waves, or other energy sources to which the device is exposed. However, particularly in the cases of scavenging energy from radio waves in a wireless network, this may impinge on the communications in the network as the scavenging device may prevent the communication from reaching its intended destination.

Power Over Wireless Energy Recharge (POWER)

The techniques herein allow a node in a wireless network to capture and store electrical power from wireless network communications. In some aspects, the techniques introduce a battery-shaped node/device that can capture wireless power and use it to power another apparatus (e.g., a sensor, remote control, etc.). Multiple battery-shaped nodes can also be used, with each node configured to capture power on different wireless frequencies. In further aspects, the techniques introduce mechanisms that allow a network device, such as a wireless access point, to control how and when power is sent to a node via wireless communications, in response to a request from the node for more power.

Specifically, according to one or more embodiments of the disclosure as described in detail below, a device in a wireless network receives a request from a node in the network requesting electrical power. The device determines one or more power transmission parameters for the node. The device determines a power transmission schedule for the node. The device sends wireless network communications to the node in response to the request and based on the determined one or more power transmission parameters and transmission schedule for the node. The node converts the wireless network communications into stored electrical power.

Illustratively, the techniques described herein may be performed by hardware, software, and/or firmware, such as in accordance with the power transfer process 248, which may contain computer executable instructions executed by the processor 220 (or independent processor of interfaces 210) to perform functions relating to the techniques described herein. For example, the techniques herein may be treated as extensions to conventional protocols, such as the various wireless communication protocols, and as such, may be processed by similar components understood in the art that execute those protocols, accordingly.

Operationally, certain aspects of the techniques herein propose a variation of wireless scavenging devices that are packaged as batteries with charge storage mechanisms (e.g., large capacitors, etc.) and a radio to communicate with a wireless communication network, such as a Wi-Fi network. An example of such a scavenging battery-shaped station (SBS) 300 is illustrated in FIG. 3, according to various embodiments.

Figure 3:
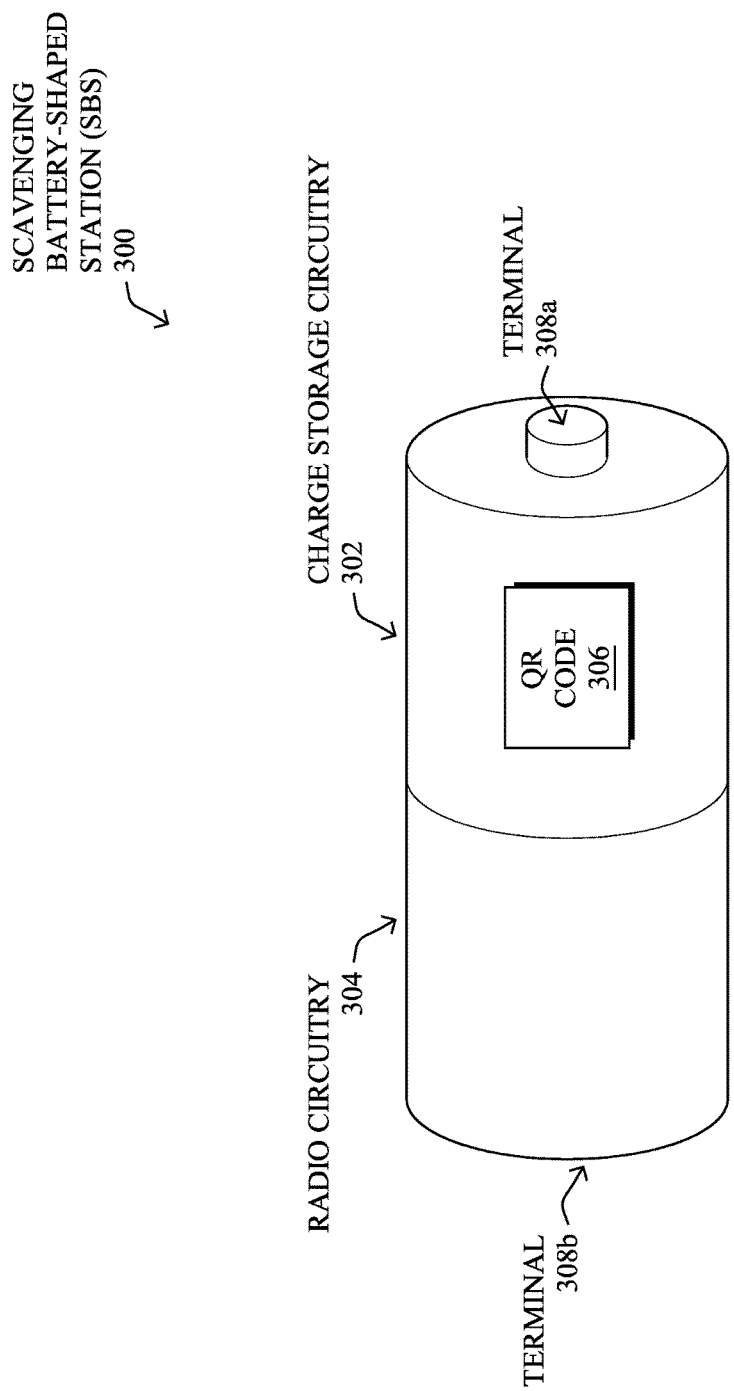
FIG. 3 illustrates an example scavenging battery-shaped station (SBS)

As shown in FIG. 3, SBS 300 may generally be shaped in the form of a conventional battery, such as an AA, AAA, C, D, or other known battery form factor. In general, SBS 300 may include charge storage circuitry 302 configured to store electrical power within SBS 300. For example, charge storage circuitry 302 may include any number of capacitors to store captured electrical power. In various embodiments, charge storage circuitry 302 may be electrically coupled to terminals 308a-308b (e.g., an anode and a cathode), allowing SBS 300 to operate as a traditional battery by providing the stored power in charge storage circuitry 302 to a host apparatus. Note that while the term "electrical power" is used primarily to describe the storage functions, other terms such as "electrical charge" and "electrical energy" are equally applicable to the techniques herein.

Also as shown, SBS 300 may include radio circuitry 304 that is able to communicate on a wireless network, such as, but not limited to, Wi-Fi™, Bluetooth™ Zigbee™, Z-Wave™, infrared (IR) relay, or any other form of wireless network. For example, radio circuitry may include an antenna and control circuitry (e.g., a processor and memory, an ASIC, an FPGA, etc.) configured to control the operations of SBS 300.

In various embodiments, radio circuitry 304 may also include circuitry configured to convert wireless communications received via its antenna into electrical power for storage by charge storage circuitry 302. For example, during operation, the radio of SBS 300 may be enabled to transmit and receive when the host device is awake and then switch to acting as a plain resistor-inductor-capacitor (RLC) circuit to load the capacitor using energy captured from any scavenged wireless communications in the area. As would be appreciated, any number of suitable circuits may be used for radio circuitry 304 and charge storage circuitry 302 in different implementations.

Further as shown, and detailed below, SBS 300 may include a scannable code, such as a quick response (QR) code 306 that provides information about SBS 300 for purposes of joining a wireless network. For example, QR code 306 may indicate a unique service set indicator (SSID) based on a serial number, MAC address, or the like.

In further embodiments, SBS 300 may also be configured to scavenge electrical power from other light-based communications, such as Li-Fi. In such cases, radio circuitry of SBS 300 may instead include a light sensing diode able to capture the beams of light transmitted by the power source (e.g., via a transparent window in the housing of SBS 300, etc.).

Figure 4A:
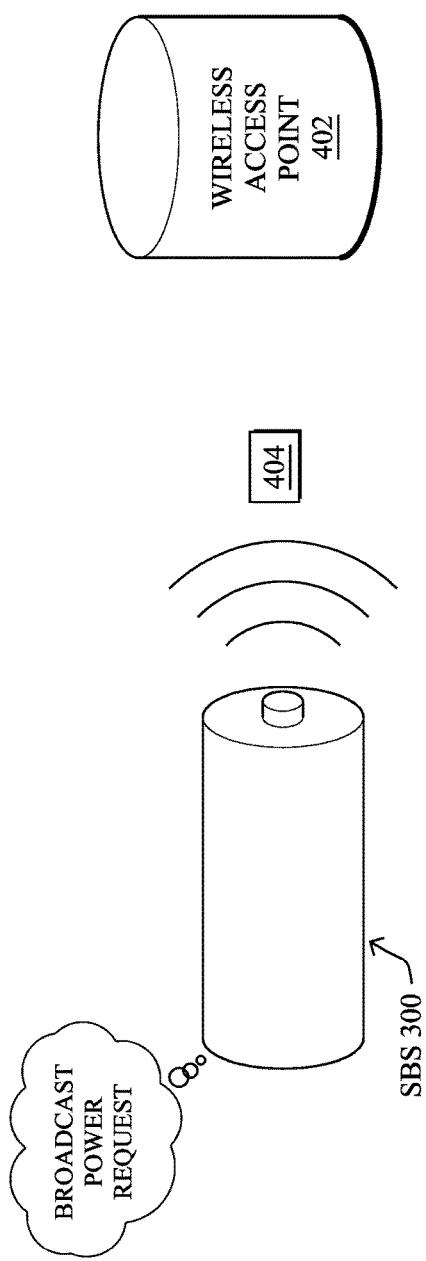
FIGS. 4A-4B illustrate examples of a wireless network device supplying power to a network node.
Figure 4B:
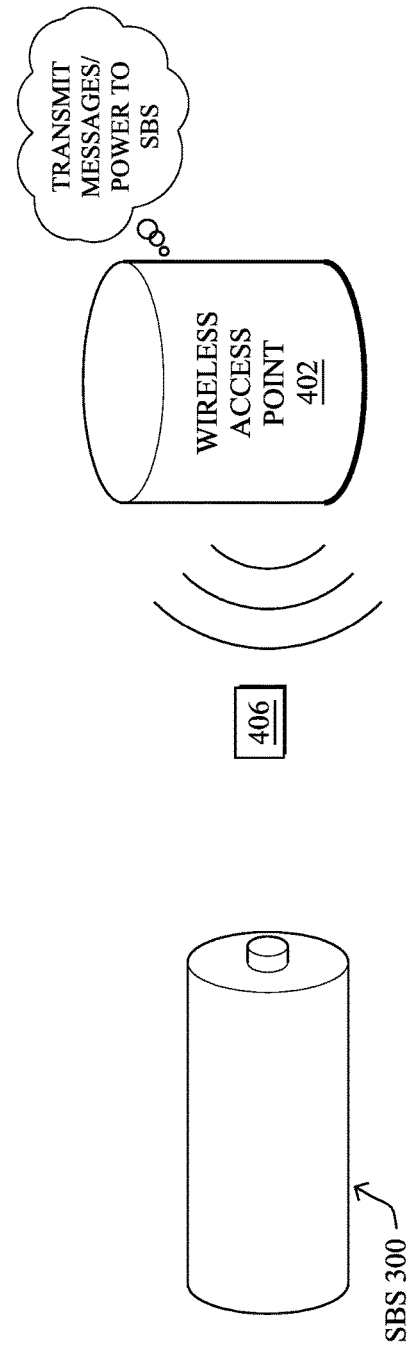

FIGS. 4A-4B illustrate examples of a wireless network device supplying power to a network node, according to various embodiments. Further aspects of the techniques herein introduce a power over wireless (PoW) protocol that enables a network node to request power via a wireless network. Such a protocol may be implemented, for example, via the Cisco Compatible Extensions (CCX) platform by Cisco Systems, Inc., or another similar mechanism.

In general, the PoW protocol herein negotiates energy/ power downloads to a wireless network node. The energy may be transmitted via a set of traditional network communication frames. In other implementations, the power may be transferred wirelessly in any other form, so long as government regulatory rules are met (e.g., the FCC in the U.S., the ETSI in Europe, etc.) and the transmissions respect the duration constraints of the communication protocol (e.g., Wi-Fi) for the rest of the network traffic.

As shown in FIG. 4A, the PoW protocol may be used between an SBS 300 and another device 402 in the wireless network, such as a wireless access point. Preferably, device 402 is "aware" that it is acting as a charging station, to allow device 402 to adjust how it sends communications/power to SBS 300. For example, in one embodiment, device 402 may not need to maintain realistic Wi-Fi traffic when sending power to node/SBS 300, so long as the communications correspond to a legal Wi-Fi transmission opportunity. In other implementations, device 402 may operate under the authority of a supervisory server or other device for purposes of implementing the PoW protocol, in which case the combination of the two (e.g., the access point and the server) acts as the charging device.

In various embodiments, SBS 300 may monitor its own stored power levels, to determine whether its stored power is below a given threshold. If so, SBS 300 may send a broadcast request 404 via the wireless network indicating a need for wireless charging. Request 404 may, for example, include a priority according to the wireless protocol in use (e.g., LP-Wi-Fi, etc.). In some cases, SBS 300 may adjust the priority using an adaptive filter of the recent power consumption. This allow an SBS powering another apparatus in heavy use (e.g., a remote control, etc.) to request more power, sooner. Such a priority in request 404 may, in turn, drive the priority of the frames sent back to SBS 400 by device/access point 402.

In one embodiment, SBS 300 may simulate that it is farther away from device/access point 402 than in actuality, when it sends power request 404. For example, SBS 300 may limit or otherwise reduce the strength at which it sends request 404. Doing so may cause the receiving device/access point 402 to switch to a low bandwidth mode with a higher emission power when responding back to SBS 300.

As shown in FIG. 4B, in response to receiving power request 404 from SBS 300, device/access point 402 may send any number of wireless communications 406 back to SBS 300 via the wireless network. In turn, SBS 300 may harvest the energy/power from wireless communications 406 for local storage. In effect, the energy transmission via communications 406 is seen as traffic that participates with a low priority to the carrier sense multiple access with collision avoidance (CSMA/CA) operation of the wireless network, in some cases.

According to various embodiments, device/access point 402 and/or another device in communication therewith may determine and control any number of parameters for communications 406. In one embodiment, device 402 may perform beamforming to direct communications 406 towards SBS 300. For example, communications 406 may include an initial response that indicates when the energy will start flowing or that more frames are needed from SBS 300 for better location. In one embodiment, device 402 may determine an increased emission power level for communications 406. For example, device 402 may use its full emission power to send communications 406 to SBS 300 and/or may use a modulation that maximizes the transmitted power. In another embodiment, device 402 may negotiate with SBS 300 to send communications 406 using very big frames that are still within any regulatory or protocol limits. Doing so will also increase the amount of power transmitted to SBS 300.

In a further embodiment, device 402 may delegate the charging of SBS 300 to another device in the network. For example, based on the location of SBS 300 as determined by communicating with SBS 300, device 402 may determine that another access point is closer to SBS 300 and delegate the charging functions to the other access point. In some cases, device 402 may instruct SBS 300 to attach to the other access point subject to their locations. In other cases, the other access point may still provide power to SBS 300 (e.g., via beamforming, PoE in the case of a bi-network with Ethernet, etc.), even if SBS 300 does not attach to the other access point. In yet another embodiment, device 402 may simply instruct another device, such as an inductive charger in close proximity to SBS 300, to initiate charging of SBS 300.

In additional embodiments, device 402 may also determine and use a scheduled time at which to send communications 406 to SBS 300. For example, device 402 may identify a time of day at which data traffic in the network is reduced or minimal, so as not to impinge on normal traffic in the wireless network. In one embodiment, device 402 or its supervisor may do so using a machine learning-based time series to assess when traffic in the network is at a low. In turn, device 402 may provide the schedule to SBS 300 so that SBS 300 is active during the scheduled charging time.

Once SBS 300 is fully charged, it may send an additional request to device 402 to request stoppage of the flow. SBS 300 may also turn its scavenging receiver off to avoid creating any form of shadow cone. In turn, SBS 300 may further arm a long time timer, to cover the leak in the capacitor and start reloading at some point. In another embodiment, if SBS 300 becomes almost fully discharged (e.g., through activity of the host apparatus), SBS 300 may move to a state where it will scavenge any energy in the band, regardless of the potential detrimental effects on the network traffic. Notably, if SBS 300 scavenges all communications that it sees, a shadow cone effect may occur that prevents any other network nodes in the code from receiving their corresponding traffic.

While SBS 300 is shown in FIGS. 4A-4B, it is to be appreciated that the functionality of SBS 300 may be integrated into another apparatus, as desired. In particular, although SBS 300 is described as having a battery shape that can be used in any number of host devices, the circuitry and functionality of SBS 300 may be integrated into a more specialized device, in other embodiments.

Referring now to FIG. 5, illustrates the network provisioning of an SBS, according to various embodiments. When first installed, an SBS 300 must be able to join the wireless network in a secure way, communicate via the network, and be granted authorization to start charging its power (e.g., on request by SBS 300). However, the energy required to perform these tasks may surpass the storage capacity of SBS 300.

To provision SBS 300 in the wireless network, in some embodiments, an SBS 300 may be placed in a battery charger 500. Notably, if SBS 300 has the form factor of a battery, it may fit within battery charger 500, allowing charger 500 to provide charge to the SBS 300. According to various embodiments, in response, the SBS 300 may enter into a configuration mode in which it operates as an access point for purposes of provisioning.

In some embodiments, SBS 300 may come in pairs (e.g., SBS 300a-300b) for provisioning and use together. As shown, each of SBS 300a-300b may include a unique code, such as QR codes 306a-306b which include the credentials needed to obtain a wireless network connection. In one embodiment, a smart phone or other device may scan QR codes 306a-306b and provision SBSs 300a-300b directly using the credentials in QR codes 306a-306b while operating in access point mode.

Generally, provisioning may indicate to SBSs 300a-300b the access point/networking device that will provide the wireless power during use (e.g., the SSID of the access point), as well as the necessary credentials to join the access point (e.g., passwords, etc.) and possibly connect to a back end application. Once provisioned, SBSs 302a-302b may revert to a station mode and attempt to associate with the indicated access point. If this succeeds, SBSs 302a-302b may briefly revert back to access point mode to confirm to the mobile device, etc. that the join process was successful.

In various embodiments, if SBSs 302a-302b are configured together, SBSs 302a-302b may also cross-configure one another. For example, during configuration, SBSs 302a-302b may indicate to one another that they are collocated. In one embodiment, SBSs 302a-302b may negotiate with one another to scavenge energy and communicate with the wireless network on different bands. For example, SCA 302a may scavenge power in the 2.4 GHz band while SCA 302b may scavenge power in the 5 GHz band. SCAs 302a-302b may also be advertised as paired to the charging network device (e.g., the wireless access point), so the location is improved and the beams are tighter.

In another embodiment, SBSs 300a-300b may not be capable of performing over the air configuration. In such cases, the provisioning application on the mobile device, etc., may notify the network access point about SBSs 300a-300b after scanning QR codes 306a-306b. In turn, the network access point may permanently register SBSs 300a-300b onto the network, so that the PoW procedure can start. The same mechanism can also be used by the access point to selectively control which devices are authorized to use PoW, thereby preventing the access point from unnecessarily attempting to charge any connected device. In a further embodiment, the access point may use a specific, well-known SSID for the charging feature without requiring any authentication at all.

Figure 6:
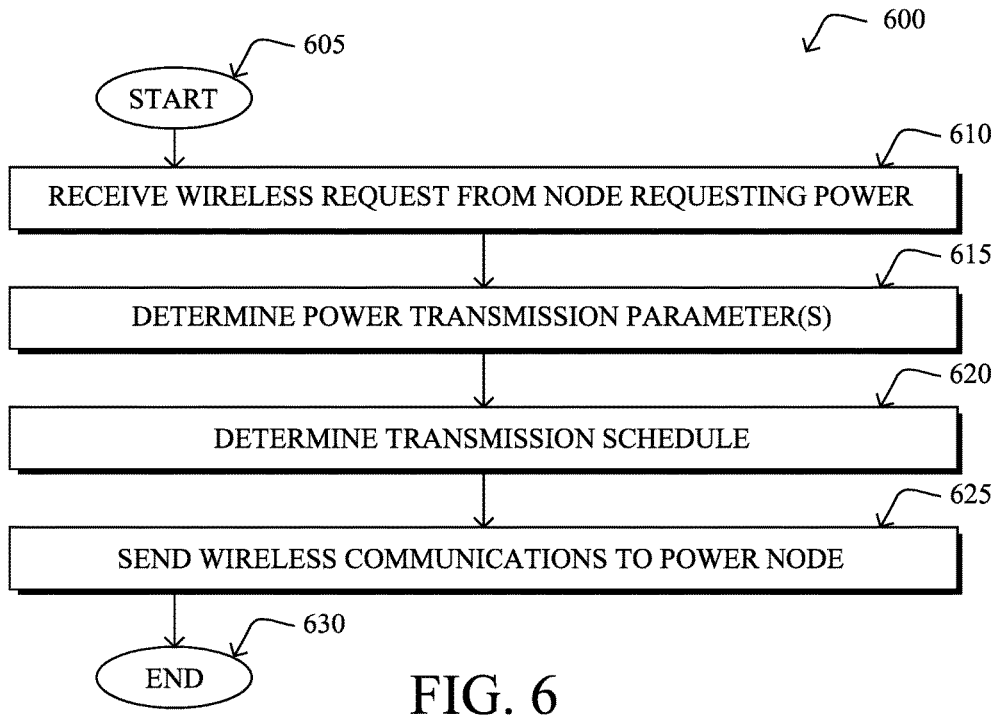
FIG. 6 illustrates an example simplified procedure for sending wireless power to a node via a wireless network.

FIG. 6 illustrates an example simplified procedure for sending wireless power to a node via a wireless network, in accordance with the embodiments herein. Generally, procedure 600 may be performed by a device in a wireless network (e.g., device 200), such as a wireless access point or other device. Procedure 600 may start at step 605 and continues on to step 610 where, as described in greater detail above, the device may receive a request from a node in the wireless network requesting electrical power.

At step 615, as detailed above, the device may determine one or more power transmission parameters for the node. For example, the device may determine any or all of the following parameters: a low-bandwidth mode at which the device is to send network communications/power to the node, an increased emission power at which the device is to send the communications to the node, or an increased frame size at which the device is to send the communications to the node. In further embodiments, the device may determine a beam form, to direct the network communications/power towards the node.

At step 620, the device may determine a power transmission schedule for the node, as described in greater detail above. In some embodiments, the device may base the schedule on an identified time at which data traffic in the wireless network is reduced or at a minimum. In doing so, the device may prevent the node from unintentionally scavenging actual data traffic in the network. In one embodiment, the device may identify such a time using a machine learning-based time series that is based on observed data traffic in the network, so as to predict when network usage is reduced.

At step 625, as detailed above, the device may send wireless communications to the node in response to the request of step 610. In various embodiments, the device may base the sending on the power transmission parameter(s) determined in step 615 and/or the schedule determined in step 620. For example, the device may determine that the ideal time to send the communications is at 3:00 AM and using its highest transmission strength possible. In turn, the node may convert the received communications into electrical power and store the electrical power. Procedure 600 then ends at step 630.

Figure 7:
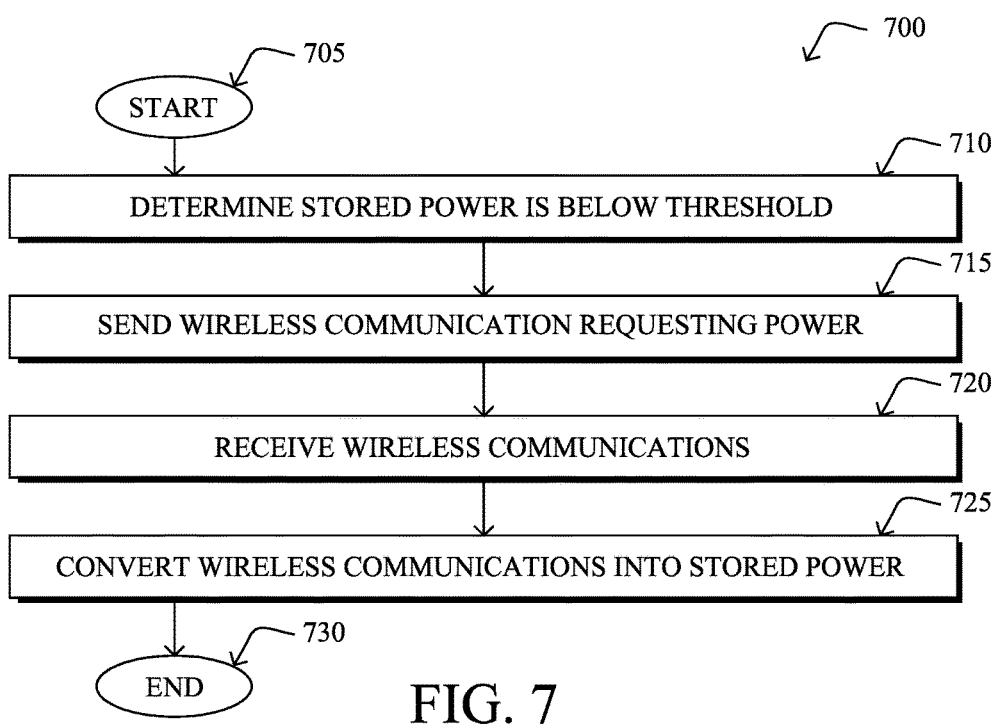
FIG. 7 illustrates an example simplified procedure for requesting wireless power in a wireless network.

FIG. 7 illustrates an example simplified procedure for requesting wireless power in a wireless network, in accordance with various embodiments herein. Procedure 700 may be performed by any node in a network configured to scavenge electrical power from wireless communications. For example, in some embodiments, a battery-shaped SBS as described above may perform procedure 700, to request electrical power via a wireless network. Procedure 700 may start at step 705 and continues on to step 710 where, as described in greater detail above, the node may determine that its stored electrical power is below a threshold. In some embodiments, the node may do so using a timer that is based on the dissipation times of the node's storage mechanism (e.g., capacitors, etc.). In further embodiments, the node may actively monitor its stored power, to determine whether it is below the threshold.

At step 715, as detailed above, the node may send a wireless communication to a device in the wireless network, to request more power. For example, the node may send a request towards an access point of the wireless network, to request that the access point send communications to the node. In some cases, the node may send the request at a reduced strength, to simulate the node being farther away from the device than in actuality. This may, in turn, prompt the device to send communications back to the node at a higher energy level/signal strength than it would otherwise.

At step 720, the node may receive wireless communications from the device, in response to sending the power request, as described in greater detail above. Generally, such communications may appear from a networking standpoint as regular frames or traffic. In other words, the device may return dummy communications back to the node for purposes of transferring power to the node.

At step 725, as detailed above, the node may convert the wireless communications into stored electrical power. As would be appreciated, the node may use any number of different wireless scavenging and power storage mechanisms. For example, the node may use a receiver that converts the wireless communications into electrical charges and store the charges in any number of capacitors. In some embodiments, the node may use this stored charge in turn to power an apparatus (e.g., a sensor, a remote control, etc.) that is powered by the node. Procedure 700 then ends at step 730.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques herein, therefore, enable battery-less operation for devices with rare transmission patterns (e.g., remote controls, low rate sensors, etc.). In some aspects, beamforming allows the techniques to work inside of a home or other environment, without perturbation to the normal network traffic and with free mobility. Further, the techniques herein provide mechanisms that allow the power source to be aware of its participation, in contrast to more passive power scavenging approaches. In addition, the techniques do not require a separate power source, but instead may leverage existing networking devices, such as a wireless access point.

While there have been shown and described illustrative embodiments that provide for the wireless transmission of power over a wireless network, it is to be understood that various other adaptations and modifications may be made within the spirit and scope of the embodiments herein. For example, while certain protocols are shown, such as Wi-Fi, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a device in a wireless network, a request from a node in the network requesting electrical power;
determining, by the device, one or more power transmission parameters for the node;
determining, by the device, a power transmission schedule for the node; and
sending, by the device, wireless network communications to the node in response to the request and based on the determined one or more power transmission parameters and transmission schedule for the node, wherein the node converts the wireless network communications into stored electrical power;
wherein the request from the node simulates the node being at a farther distance from the device than an actual distance from the device.

2. The method as in claim 1, wherein determining the power transmission schedule for the node comprises:
identifying, by the device, a time at which data traffic in the wireless network is reduced and during which the device should send the wireless network communications to the node.

3. The method as in claim 2, further comprising:
using, by the device, a machine learning-based time series to identify the time at which the data traffic in the wireless network is reduced.

4. The method as in claim 1, wherein the determined one or more power transmission parameters comprises at least one of: a low-bandwidth mode at which the device is to send the communications to the node, an increased emission power at which the device is to send the communications to the node, or an increased frame size at which the device is to send the communications to the node.

5. The method as in claim 1, wherein the wireless network communications sent to the node are at least one of: Wi-Fi communications, Bluetooth communications, Zigbee communications, Z-wave communications, or infrared (IR) communications.

6. The method as in claim 1, further comprising:
causing, by the device, a second device to provide power to the node, based on a determined location of the node.

7. A method comprising:
determining, by a node in a wireless network, that electrical power stored by the node has decreased below a threshold;
sending, by the node, a wireless request for power to a device in the network, in response to determining that the electrical power stored by the node has decreased below the threshold;
receiving, at the node, wireless communications from the device, in response to the request for power; and
converting, by the node, the wireless communications into stored electrical power;
wherein sending the request for power to the device comprises:
generating the request at a selected emission power level to simulate that the node is at a farther distance from the device than an actual distance from the device.

8. The method as in claim 7, wherein the wireless communications from the device are at least one of: Wi-Fi communications, Bluetooth communications, Zigbee communications, Z-wave communications, or infrared (IR) communications.

9. The method as in claim 7, wherein the wireless communications from the device are received according to a transmission schedule selected by the device.

10. The method as in claim 7, further comprising:
receiving the communications on a first wireless frequency that is negotiated with a second node, wherein the second node converts wireless communications on a second wireless frequency into stored electrical power.

11. The method as in claim 7, further comprising:
determining, by the node, that the node has been placed in a charging station; and, in response,
provisioning the node to join the wireless network.

12. The method as in claim 11, wherein the node is provisioned via a quick response (QR) code.

13. The method as in claim 7, wherein the node is a battery-shaped station, the method further comprising:
powering, by the node, another apparatus using the electrical power stored by the node.

14. An apparatus, comprising:
a network interface to communicate with a wireless network;
a processor coupled to the network interface and configured to execute one or more processes; and
a memory configured to store a process executable by the processor, the process when executed operable to:
receive a request from a node in the wireless network requesting electrical power;
determine one or more power transmission parameters for the node;
determine a power transmission schedule for the node; and
send wireless network communications to the node in response to the request and based on the determined one or more power transmission parameters and transmission schedule for the node, wherein the node converts the wireless network communications into stored electrical power;
wherein the request from the node simulates the node being at a farther distance from the device than an actual distance from the device.

15. The apparatus as in claim 14, wherein the apparatus determines the power transmission schedule for the node by:
identifying a time at which data traffic in the wireless network is reduced and during which the apparatus should send the wireless network communications to the node.

16. The apparatus as in claim 15, wherein the process when executed is further operable to:
use a machine learning-based time series to identify the time at which the data traffic in the wireless network is reduced.

17. The apparatus as in claim 14, wherein the determined one or more power transmission parameters comprises at least one of: a low-bandwidth mode at which the apparatus is to send the communications to the node, an increased emission power at which the apparatus is to send the communications to the node, or an increased frame size at which the apparatus is to send the communications to the node.

18. The apparatus as in claim 14, wherein the wireless network communications sent to the node are at least one of:

Wi-Fi communications, Bluetooth communications, Zigbee communications, Z-wave communications, or infrared (IR) communications.

\* \* \* \* \*